United States Patent [19]

Spencer et al.

[11] 4,388,729
[45] Jun. 14, 1983

[54] SYSTEMS FOR REDUCING NOISE IN VIDEO SIGNALS USING AMPLITUDE AVERAGING OF UNDELAYED AND TIME DELAYED SIGNALS

[75] Inventors: Paul A. Spencer; Ray M. Dolby, both of London, England

[73] Assignee: Dolby Laboratories, Inc., San Francisco, Calif.

[21] Appl. No.: 921,045

[22] Filed: Jun. 30, 1978

Related U.S. Application Data

[63] Continuation of Ser. No. 629,541, Nov. 6, 1975, abandoned, which is a continuation of Ser. No. 450,903, Mar. 13, 1974, abandoned.

[30] Foreign Application Priority Data

Mar. 23, 1973 [GB] United Kingdom ............... 14272/73

[51] Int. Cl.³ .................... H04B 1/64; H04N 5/21; H04J 3/18; H04B 1/64
[52] U.S. Cl. ........................................ 455/72; 358/36; 358/167; 370/7; 333/14; 328/169
[58] Field of Search .................. 358/36, 167, 8, 905; 325/42, 62, 65; 179/1 P; 360/24, 33, 38; 328/162, 163, 165, 167, 169; 333/14, 18, 70 T; 455/50, 52, 63, 65, 72; 375/12, 14, 27, 31, 34, 58

[56] References Cited

U.S. PATENT DOCUMENTS

| | | | |
|---|---|---|---|
| 2,310,692 | 2/1943 | Hansell | 358/167 X |
| 3,432,761 | 3/1969 | Morine | 328/165 |
| 3,502,986 | 3/1970 | Lucky | 325/42 X |
| 3,605,019 | 9/1971 | Cutter et al. | 325/65 |
| 3,648,171 | 3/1972 | Hirsch | 328/162 X |
| 3,697,875 | 10/1972 | Guanella | 325/42 X |
| 3,715,670 | 2/1973 | Hirsch et al. | 325/42 X |
| 3,716,670 | 2/1973 | Lowry | 178/6.7 A |
| 3,716,678 | 2/1973 | Staar | 179/100.2 T |
| 3,716,807 | 2/1973 | Sha et al. | 325/42 X |
| 3,752,906 | 8/1973 | Lowry | 178/5.4 CD |
| 3,752,916 | 8/1973 | Lowry et al. | 178/7.3 R |
| 3,772,465 | 11/1973 | Vlahos et al. | 178/5.2 D |
| 3,775,705 | 11/1973 | Dolby | 179/1 P X |
| 3,778,543 | 12/1973 | Lowry | 178/5.4 R |
| 3,804,980 | 4/1974 | Lowry | 178/7.1 |
| 3,978,409 | 8/1976 | Dolby et al. | 325/62 |
| 4,064,530 | 12/1977 | Kaiser et al. | 358/36 |
| 4,090,221 | 5/1978 | Connor | 358/167 X |
| 4,107,736 | 8/1978 | Lowry et al. | 358/36 |

FOREIGN PATENT DOCUMENTS

| | | |
|---|---|---|
| 1271161 | 6/1968 | Fed. Rep. of Germany . |
| 1287114 | 1/1969 | Fed. Rep. of Germany . |
| 1105958 | 3/1968 | United Kingdom . |
| 1113223 | 5/1968 | United Kingdom . |
| 1119261 | 7/1968 | United Kingdom . |
| 1402609 | 8/1975 | United Kingdom . |

OTHER PUBLICATIONS

"Circuit for Improving Signal to Noise Ratio", G. Singleback; RCA Technical Notes, No. 494, Sep. 1961.

*Primary Examiner*—Aristotelis M. Psitos
*Attorney, Agent, or Firm*—Robert F. O'Connell

[57] ABSTRACT

Noise reduction of a signal such as a video signal is effected by averaging a plurality of relatively delayed replica signals, e.g. with line or field delays therebetween, in a decoding processor, the highly redundant information content of the signal being reinforced by the averaging while random noise undergoes a partial cancellation. In order to overcome the problem of signal changes caused by the decoding processor, the signal is encoded prior to application to the noise-introducing signal channel by a complementary encoding processor in which one or more replica signals are subtractively combined with one or more other replica signals. In both processors a variable combining means is employed to exclude from the combination replica signals which have a non-small difference from the replica signals in the combination, thereby to avoid smearing of the information content (with consequent picture smearing in the case of a video signal) when the signal is changing, e.g. because of movement in a picture.

60 Claims, 11 Drawing Figures

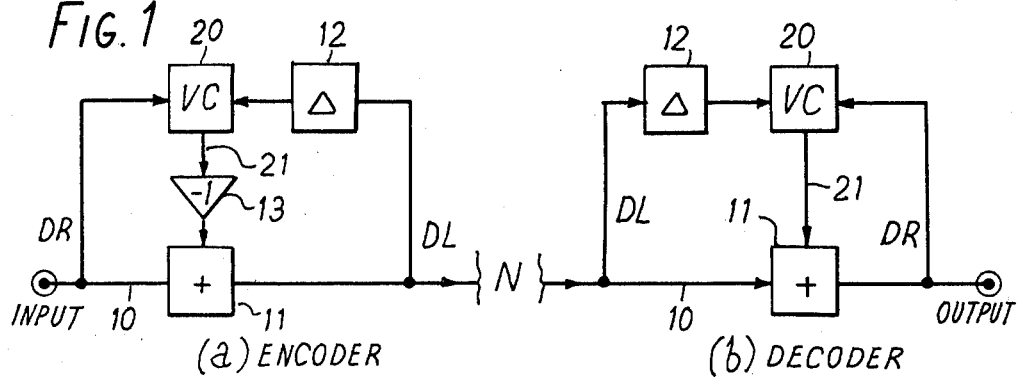
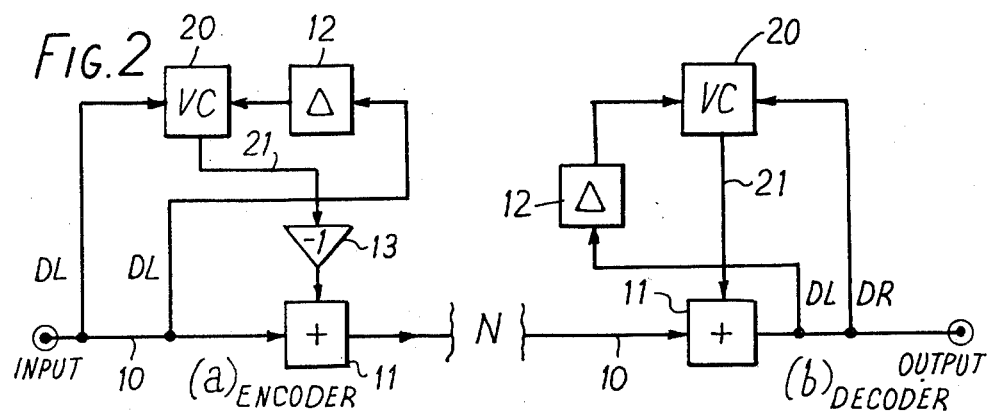
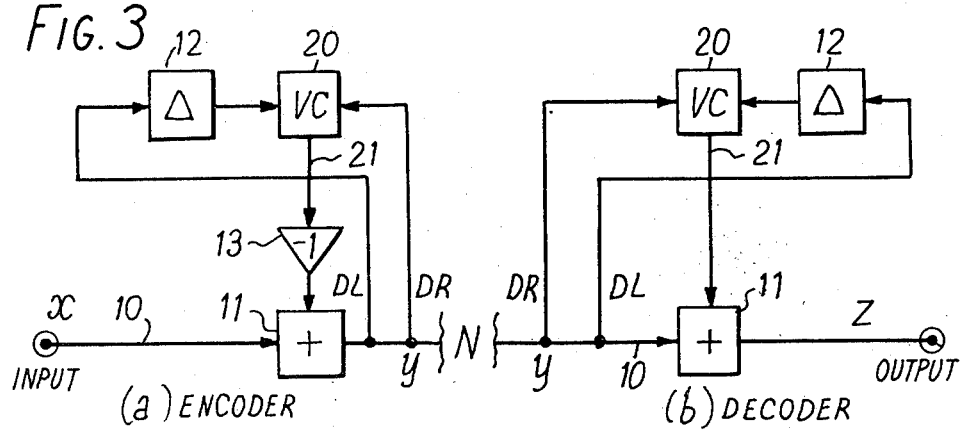

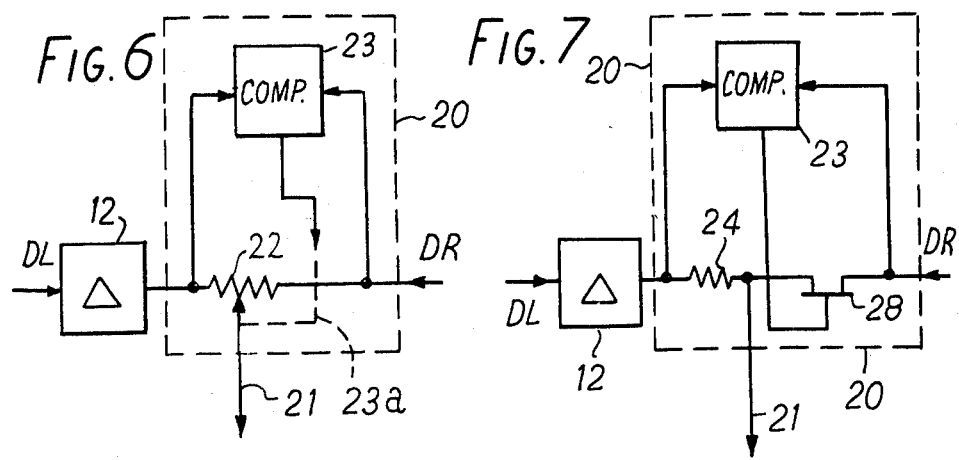
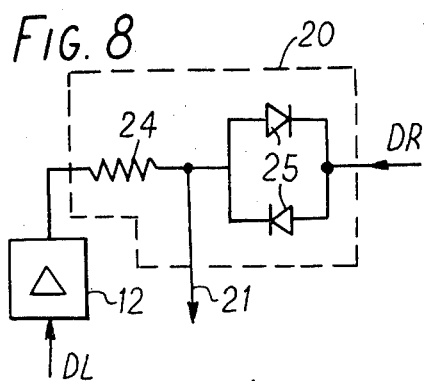
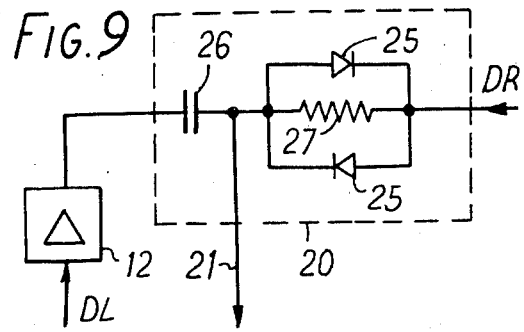
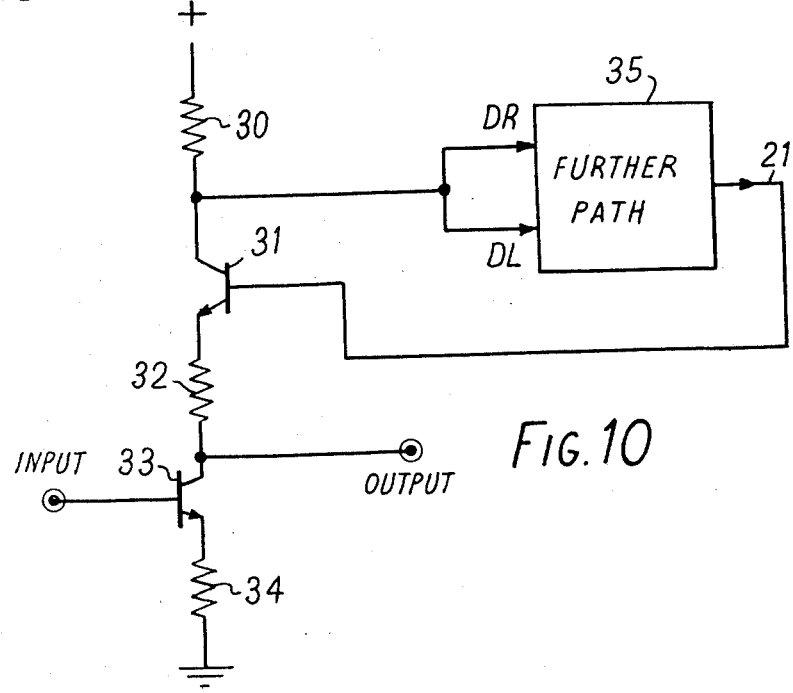

SYSTEMS FOR REDUCING NOISE IN VIDEO SIGNALS USING AMPLITUDE AVERAGING OF UNDELAYED AND TIME DELAYED SIGNALS

This is a continuation of application Ser. No. 629,541, filed Nov. 6, 1975, now abandoned, which is in turn a continuation of Ser. No. 450,903, filed Mar. 13, 1974, now abandoned.

RELATED PATENTS

Reference is made to U.S. Pat. No. 3,978,409, issued on Aug. 31, 1976 to the present applicants, the said patent being granted on application Ser. No. 477,205, filed June 7, 1974, which was a continuation of Ser. No. 346,689, filed Mar. 30, 1973, now abandoned. The said patent is also concerned with noise reduction of video and like signals and describes further features which may be incorporated in the present invention, specifically the treatment of signals including carrier component as described with reference to FIGS. 20 and 21 of the said patent and switching techniques as between encoding and decoding processors as described with reference to FIG. 7 of the said patent.

This invention relates to noise reduction systems, having particular utility in reducing noise in highly redundant repetitive electrical signals such as video signals, and to signal processors for such systems. The quality of video signals can be improved by averaging two or more fields. This has the effect of reinforcing the wanted content of the signal relative to unwanted noise which varies randomly from field to field. The averaging procedure nevertheless unavoidably introduces some changes in the signal, typically involving a reduction in detail, caused by smearing when there is movement in the picture, and one object of the present invention is to provide a system which does not suffer from this defect.

According to the present invention, there is provided a signal processor, comprising means for providing a plurality of replica signals derived from an input signal with differing signal delays, variable combining means for variably combining the replica signals to provide an output signal and responsive to a difference or differences between the replica signals to cause the output signal to consist of a combination of all the replica signals when the or each said difference is small and to consist, when any said difference is not small, of the combination of a selected one or more of the replica signals such that the or each said difference pertaining to the selected replica signals is small.

The signal processor may be operative in either an encoding mode or a decoding mode. In the decoding mode, the combining action is additive and an averaging effect is thereby normally achieved. This effect disappears or is reduced when any said difference is not small; accordingly, undesirable averaging having the effect of smearing a changing signal is eliminated. In the encoding mode, the combining action subtracts one or more of the replica signals from the remaining replica signal(s) to effect a processing action complementary to that provided by the decoding mode. The mode of the circuit is determined by the coefficients and relative polarities of the replica signals which are combined.

A decoding processor may be used alone to provide a noise reduction action with relatively little change in the signal itself but it is preferred to use both an encoding circuit and a decoding circuit to form a fully complementary noise reduction system.

In a complementary system, a signal is first processed by the encoding circuit. The encoded signal is fed to the decoding circuit either in a real time system via a transmission channel or via a record/playback system. The term "information channel" is used to refer generically to the means which convey the encoded signal to the decoding circuit. If a record/playback system is used, a single circuit may be used for both encoding and decoding, appropriate switching being employed to effect the change between the encoding and decoding modes.

One of the differing signal delays can be zero delay, i.e. one of the replica signals will consist of a direct, undelayed signal derived from the input signal. This is economical and furthermore leads to circuit configurations which lend themselves to obtaining fully complementary encoding and decoding characteristics.

The distinction as to when a signal difference is small or not small may be arbitrarily determined to suit a given application of the invention but, in general, the distinction will be made upon the basis of thresholds lying in the range from 1% to 10% of peak signal level.

In the simplest case just two replica signals are employed and, when the difference therebetween is small, they are both combined. When the difference is not small, only one of the signals, which may be always the same predetermined one, contributes to the output signal. There may be an abrupt change between these two conditions determined by a single threshold applied to the difference between the signals, e.g. a threshold of approximately 1% of peak signal level, the difference being small and not small up to 1% and above 1% respectively. However, the change may be progressive so that, so long as the difference does not exceed a low threshold of 1% it is small and both replica signals contribute to the output signal. Above a 1% difference the contribution of the second signal is progressively reduced until, at a higher threshold of say 10%, the difference is regarded as not small and the second signal makes no contribution to the output signal. Between 1% and 10% the difference is then intermediate small and not small and the second signal makes an intermediate contribution to the output signal.

When more than two replica signals are used, various possibilities exist for selecting one or more of these signals when any difference becomes not small. The simplest possibility is, whenever any difference becomes not small, to select a single predetermined one of the replica signals, e.g. the direct signal. However, in more general terms, when a difference exists which is not small, the replica signals can be segregated into two classes which will be called valid and invalid. The differences between the valid signals are all small but the differences between the invalid signals, on the one hand, and the valid signals, on the other hand, are not small. The determination as to which is the valid class and which is the invalid class may be made by specifying that the valid class always includes a predetermined one of the replica signals, e.g. the direct signal, or possibly in other ways such as specifying that the valid class is the numerically stronger class. Having thus segregated the replica signals, the output signal can consist of any combination of one or more of the valid signals.

This is the case in an embodiment described below in which a predetermined one of the signals, namely the direct signal, is always valid. The other replica signals are individually compared therewith. So long as the difference between any one of the said other signals and the said one signal is small, this other signal is valid and is included in the combination forming the output signal; when the difference is not small, the other signal is invalid and is excluded from the output combination.

Again, an abrupt or gradual transition may be employed. In the latter case, the combination will consist of all the replica signals when all differences are small and all signals are valid and will consist only of valid signals when some differences are not small and some signals are thus invalid. When there are intermediate differences, there will be some signals which are intermediate valid and invalid; such signals will make an intermediate contribution to the output signal.

The total number of replica signals can be written as N, namely an integer greater than 1. The variable combining means are preferably arranged always to combine N signals regardless of whether any signal is invalid or not. When any signal is invalid, the variable combining means replace it by a duplicate of a vaid signal. Since N signals are always combined, the level of the output signal is not affected by the varying number of signals which are valid. This avoids the problem which would otherwise arise if invalid signals were simply switched out of the combination.

It is preferred to provide a main signal path including a first combining means, and a further path including a second, variable combining means responsive to a delayed version of the signal at the input side or the output side of the first combining means and to an undelayed signal at the input side or the output side of the first combining means to feed to the first combining means a further path signal which combines with the signal is the main path and which consists substantially of the delayed version signal when the difference between the delayed version signal and the undelayed signal is small and which consists substantially of the undelayed signal when the said difference is not small.

In the decoding mode, the further path signal boosts the main path signal; in the encoding mode, the further path signal bucks or subtracts from the main path signal.

In operation, so long as the said difference is small, the delayed signal is combined with the main path signal to provide the averaging, noise-reducing action, in the case of the decoder. When the said difference is not small, the direct signal is used, whereby smearing is eliminated. This is because the signals combined by the first combining means are now essentially one and the same signal. The output signal becomes the same as the direct signal which is the same as the input signal, subject only to differences in level. When this is the case, the noise-reducing action is eliminated but, in the case of a video signal for example, this is not ojectionable because noise is masked subjectivey by the movement in the picture which has led to the use of the direct signal.

The action of the variable combining circuit preferably takes place with a sufficiently short time constant to eliminate the noise-reducing action only in the part of the picture where movement is occurring, while retaining the action in the still parts of the picture.

The period t of the delay to which the delayed signal is subjected is preferably equal to a period of the input signal when this is a repetitive, redundant signal such as a video signal. For example, t may be one or more line periods or one or more field or picture periods in the case of a video signal. However, the period t may also be short compared with the repetition period. The decoding circuit can then average out noise at frequencies higher than the repetition frequency and even up the highest frequency component of interest.

To improve the averaging action in the decoding circuit, it is preferred to derive a plurality of delayed signals with delays of t, 2t ... Nt (where N is an integer greater than 1), which delayed signals jointly boost the signal in the main path.

The or each delayed signal can be derived by means of any suitable delay means such as a delay line of appropriate delay time. When the circuit is used in conjunction with a recorder, it is possible to derive signals of differing delays simultaneously from different heads of a multi-head video disc recorder, for example, whether this records the video signal magnetically, optically or mechanically, (i.e. as grooves). Video storage tubes can also be used to provide the required delays.

The transition from use of the delayed signal to use of the direct signal, and vice versa, may be abrupt (switched) or gradual.

In a complementary system, the boosting action effected by combining the input signal and the delayed signal(s) in the decoding circuit effects the aforementioned averaging, but this is complementary to a bucking action in the encoding circuit in which the or each delayed signal bucks the input signal, whereby the overall effect of the encoding and decoding circuits is to restore the input signal to its original form while the decoding circuit reduces noise introduced in the information channel by averaging such noise. It is clear that the bucking action in the encoding circuit must not completely cancel the input signal.

The invention will be described in more detail, by way of example, with reference to the accompanying drawings, in which:

FIGS. 1 to 4 show four generalised embodiments of the invention;

FIG. 6 illustrates the principle of a variable combining means;

FIGS. 7 to 9 show two practical circuits for a variable combining means;

FIG. 10 shows a series mode decoder embodying the invention, and

Figure 4:
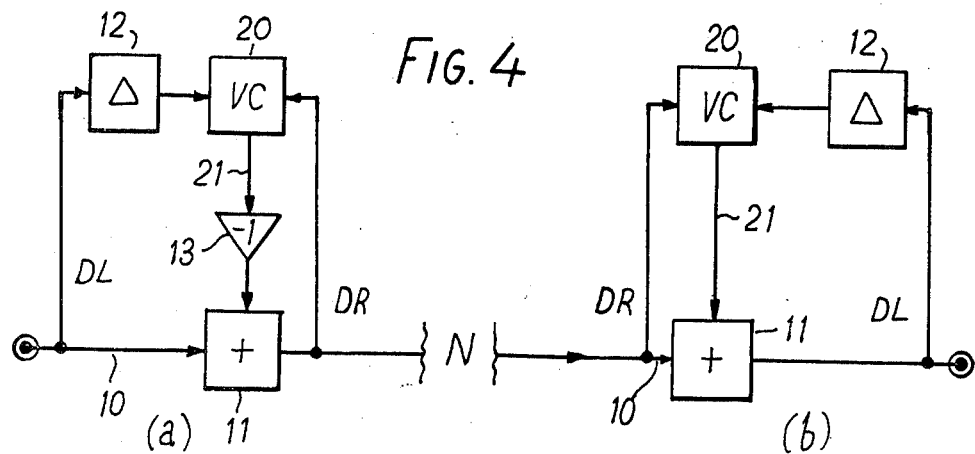

For convenience, FIGS. 1 to 4 show a delay circuit 12, designated by the symbol Δ, for providing the delayed signal. It will be realised from the foregoing that, in certain instances it may not be necessary to provide separate delay devices, i.e. when the delayed signal can be taken directly from a recording medium.

To simplify presentation of the invention the convention is adopted throughout the drawings that, wherever signals are combined they are combined, (i.e. mixed) additively (by blocks denoted "+") and inverters 13 are shown (by blocks denoted "−") when subtractive combination is required. It will be appreciated that the same overall result may be achieved in various ways with inverters in places other than those shown and/or with the use of combining circuits such as differential amplifiers which do subtract one signal from the other. It is merely necessary that closed loops illustrated as inverting should, overall, remain inverting; that non-inverting loops should, overall, remain non-inverting; and that the results of combining signals should remain additive or subtractive, as the case may be.

In each of FIGS. 1 to 4, an encoder is shown at (a) and a decoder at (b), the encoder feeding the decoder via an information channel represented by a broken connection with the symbol N which signifies the noise introduced in the information channel and reduced by averaging in the decoder.

The system shown in FIGS. 1 to 4 will now be described. Each decoder may be used on its own to treat an unencoded signal, effecting noise reduction simply by averaging. However, a complete system employing encoder and decoder has the advantage that the decoder output is the same as the encoder input. In each of FIGS. 1 to 4, a fully complementary action is achieved, the decoder being of the same type as the encoder. It may in some instances be convenient to use encoders and decoders of different types, e.g. a FIG. 2(a) encoder could be used with a FIG. 3(b) decoder.

Each encoder and decoder has a main path 10 and combining means 11 therein. A further path has a direct input labelled DR and a delay input labelled DL, providing direct and delayed signals to a variable combining means 20 whose output 21 is connected to the combining means 11 through an inverter 13 to buck the main path signal in the encoders and is connected to the combining means 11 to boost the main path signal in the decoders. The differences between the four types represented in the four Figures lie in the points whence the direct and delayed signals are derived. These points can be tabulated as follows if the symbols I and O are used to denote the input and output side of a combining means 11. In every case the decoder is complementary to the encoder.

| TYPE | ENCODER INPUTS | | DECODER INPUTS | |
|---|---|---|---|---|
| | DL | DR | DL | DR |
| FIG. 1 | O | I | I | O |
| FIG. 2 | I | I | O | O |
| FIG. 3 | O | O | I | I |
| FIG. 4 | I | O | O | I |

The variable combining circuit 20 normally applies the signal from the dealy input DL to the combining means 11 but has such characteristics, or is so controlled, that it applies the signal from the direct input DR to the combining means when the direct and delayed signals differ by more than a small amount. Examples will later be described.

Certain restrictions are imposed upon the gains of some of the feedforward and feedback loops in FIGS. 1 to 4. Firstly, the gains of feedforward loops in the encoders must be less than unity; otherwise the further path output cancels out or even inverts the main path signal. Secondly, the gains of positive feedback loops must be less than unity in order to avoid instability. The use of path gains less than unity in a decoder is disadvantageous because it provides less than optimum averaging. Although further path gains of unity are possible with the decoder of FIG. 3(b), it is not possible to use such gains in a complementary system since the gains of the encoder of FIG. 3(a) must be less than unity. (The futher path gains of all encoders must be less than unity for one or the other of the reasons given above).

It is, therefore, preferred to use a path gain less than unity, say a gain not greater than 0.9 and preferably a gain of 0.8, to be sure of stability and to use more than one delayed signal to improve the averaging and hence noise reduction.

Figure 5:
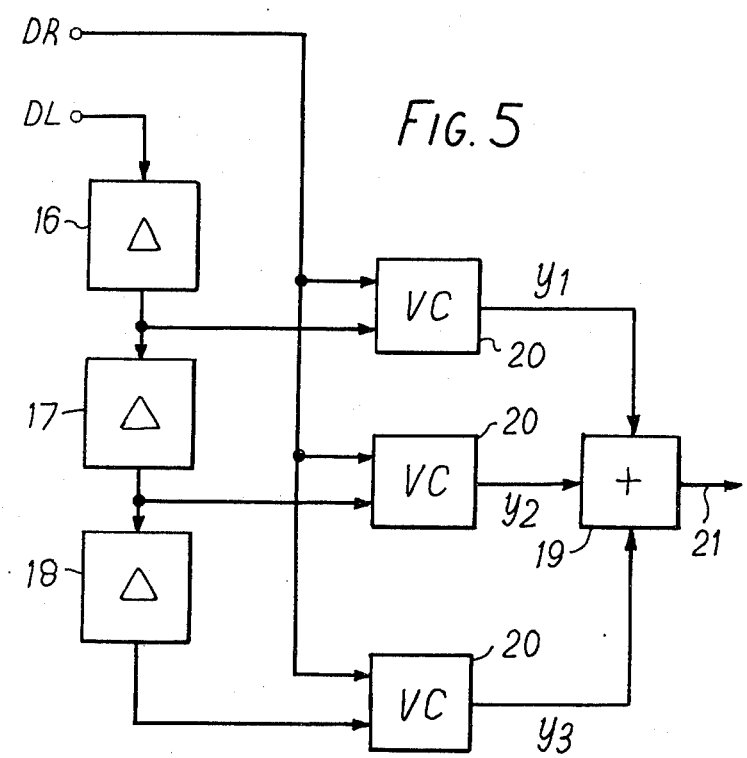
FIG. 5 shows a further path for use in any of FIGS. 1 to 4 and employing more than one delay.

An example is given in FIG. 5 of a further path with direct and delay inputs DR and DL, a further path output 21 correspondingly numbered in each of FIGS. 1 to 4, in any of which Figures, FIG. 5 may be substituted. Three delay means 16, 17 and 18 provide delays of t, 2t and 3t. No significance attaches to the particular number of delay means; there may be two, three, four, or more. Each delay means feeds its own variable combining means 20, the outputs of which are added by combining means 19 to provide the further path output at 21.

Using the symbols appearing on FIGS. 3 and 5, it can be seen that, in the encoder:

$$y = x - (y_1 + y_2 + y_3)$$

In the decoder:

$$\begin{aligned} z &= y + (y_1 + y_2 + y_3) \\ &= x - (y_1 + y_2 + y_3) + y_1 + y_2 + y_3 \\ &= x. \end{aligned}$$

Thus, it can be seen that the decoder and encoder are completely complementary so that the decoder output z is the same as the encoder input x. The noise N introduced in the information channel has been ignored, but this is reduced by the averaging action of the decoder since it is non-coherent in the four signals which are combined in the decoder, whereas y, $y_1$, $y_2$ and $y_3$ are coherent and reinforce each other.

Although the analysis is not given it can readily be seen that, if the further path gains in the encoder and decoder of FIG. 1, FIG. 2 or FIG. 3 are equal, the encoder and decoder are again complementary.

The signal y in the information channel is at a lower level than the input signal x (and the output signal z). This can be seen from FIGS. 3 and 5 for example where, if $y_1$, $y_2$ and $y_3$ are all substantially the same, (as will be the case if x is a video signal and the delay t equals an integral, preferably even, multiple of the field period of the video signal), and the gain of each loop is 0.8, we have in the encoder:

$$y = x - (y_1 + y_2 + y_3)$$

Also $y_1 = y_2 = y_3 = 0.8y$ (to a close approximation).
Therefore $y = x - 3 \times 0.8y$ and $y = x/3.4$ or approximately $y = 0.3x$.

In the decoder:

$$\begin{aligned} z &= y + (y_1 + y_2 + y_3) \\ &= x/3.4 + 3 \times 0.8 \, x/3.4 \\ &= x \end{aligned}$$

FIG. 6 shows one variable combining means 20 in which the delayed and direct signals are applied to the two ends of a potentiometer 22. The further path output 21 is taken from the wiper of the potentiometer. A comparator 23 compares the signals at the two ends of the potentiometer to provide a difference, or error, signal which drives the wiper through a servo represented by the broken line 23a. So long as the error signal (which may be subjected to smoothing with a suitable time constant) remains below a predetermined threshold, the wiper of the potentiometer remains at the left hand end in the drawing and the further path output is exclusively the delayed signal. Above the threshold, as the error signal increases it causes the wiper to shift more and more to the right to contribute more and more of the direct signal, which ultimately takes over completely from the delayed signal.

As FIG. 6 is drawn, it presupposes an electromechanical servo control of the potentiometer wiper. In practice, the effect described can be obtained by purely electrical means involving known techniques, for example using FET's or transistors as controlled resistances. This is illustrated in FIG. 7 in which the error signal increases the conduction of an FET 28 in series with a resistor 24 when the resistance of the FET falls substantially below that of the resistor the direct signal is substituted for the delayed signal. The change is progressive.

It is not necessary to use a controlled variable combining means. FIG. 8 shows a simple passive circuit in which the delayed signal is normally coupled to the output 21 through the resistor 24. When the difference between the direct and delayed signals exceeds the threshold of two back-to-back diodes 25, these conduct and transmit the direct signal to the output 21, since their resistance is then much less than that of the resistor 24. The transition from delayed to direct signal is, in this case, dependent on the diode characteristics.

FIG. 9 shows a modification of FIG. 8, in which the resistor 24 is replaced by a high pass filter, consisting of capacitor 26 and resistor 27. The impedance of the filter is less at high frequencies than at low frequencies and the tendency for the direct signal to take over from the delayed signal will accordingly be greater at low frequencies than at high frequencies. This is of advantage in that discrepancies between the two signals are typically more significant at low frequencies than at high frequencies. The higher threshold operative at high frequencies will allow noise reduction to take place at such frequencies even when, at lower frequencies the direct signal is taking over from the delayed signal. Where an RF signal is present, the capacitor 26 may be supplemented or replaced by a tuned circuit. Different frequency bands in the input spectrum can, in general, be handled separately by separate combining means, each with appropriate frequency characteristics, connected in parallel to given signal sources of different delays. The outputs of the separate combining means are then combined together.

Although it is preferred to combine the signals in the manner illustrated in FIGS. 1 to 4, utilizing a main path and further path in a parallel arrangement, a series mode circuit can be employed. This is illustrated for a decoder only in FIG. 10. A voltage divider circuit consists of a resistor 30, a transistor 31, a resistor 32, a transistor 33 and a resistor 34. The transistor 33 acts as a current source controlled by the input signal and the resistor 32 contributes a voltage to the output, taken from the collector of the transistor 33. The voltage across the transistor 31 is combined with the voltage across the resistor 32, the transistor 31 being used as a variable impedance device controlled by the further path 35, which may have the simple form of FIG. 3(b), for example, or the more complex form of FIG. 5, and derives both its direct and delay inputs DR and DL from the collector of the transistor 31, which provides a signal related to the current through the circuit and thereby to the input signal.

Figure 11:
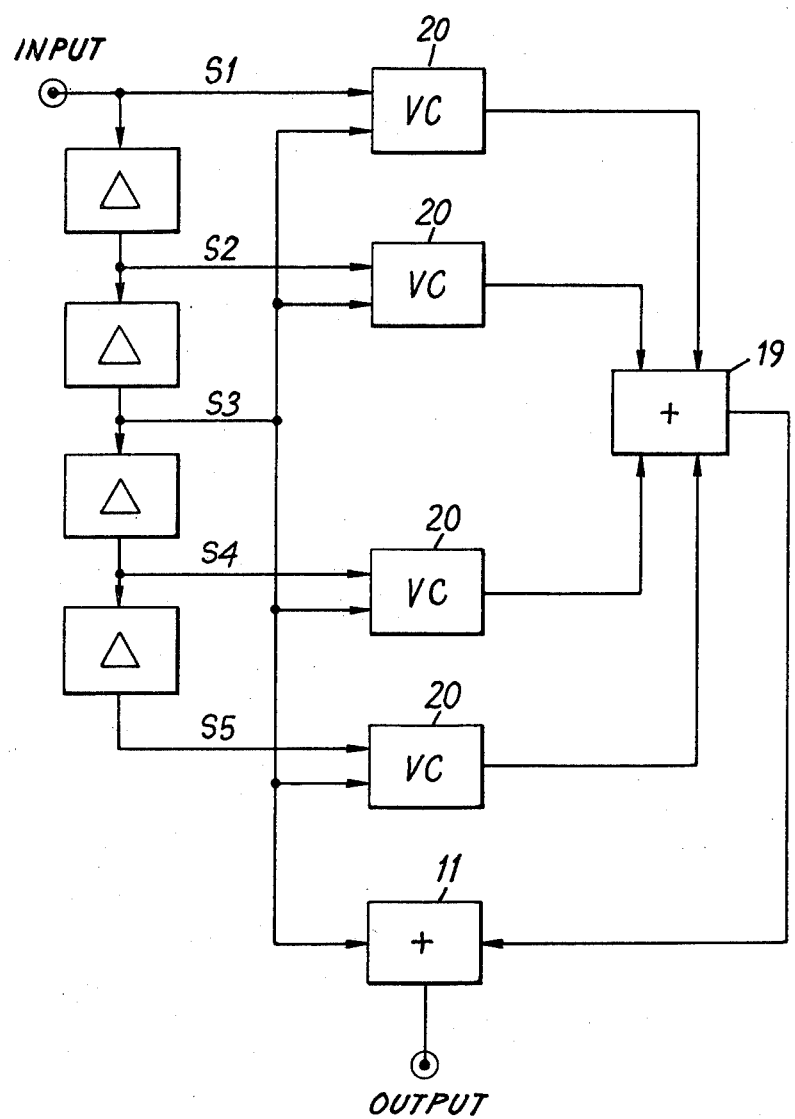
FIG. 11 shows another decoder embodying the invention.

In FIG. 5, the direct signal is always treated as the main signal which takes over when any delayed signal differs therefrom. However, one of the delayed signals may be treated as the main signal as is illustrated in the decoder of FIG. 11. Four delays respond to an input signal S1 to provide four delayed signals S2 to S4 delayed by t, 2t, 3t and 4t respectively where t may be a line or field period. S3 is treated as the main signal and is applied as one input to the combining means 11. The second input normally consists of S1+S2+S4+S5 provided by the combining means 19. However, the variable combining means 20 compare each of S1, S2, S4 and S5 with S3 and progressively replace each of S1, S2, S4 and S5 by S3 when the difference relative to S3 increases above a small threshold.

The invention may be employed to reduce noise introduced by a standards converter, in which case an encoder preceding the converter will have delay lines and other parameters appropriate to the standard of the input signal while a decoder following the converter will have delay lines and other parameters appropriate to the standard of the output signal.

We claim:

1. A signal processor for processing an input signal and comprising means for providing an output signal from a plurality of related signals with similar wave shapes but with differing signal delays relative to the input signal, means for deriving each of said related signals from a signal selected from one of said input and output signals, variable combining means for variably combining the related signals to provide the output signal and responsive to at least one difference between the related signals to cause the output signal to consist of a combination of all the related signals when the difference is small and to exclude from the combination, when any said difference is not small, one or more of the related signals such that any difference pertaining to the non-excluded related signal or signals is small, and wherein the combining means subtract at least one of the related signals from the remaining related signal(s).

2. A signal processor according to claim 1, wherein the variable combining means select a single predetermined one of the related signals when any said difference is not small and exclude the other related signal(s).

3. A signal processor according to claim 2, wherein the variable combining means replace the or each excluded related signal by a further related signal which has the same signal delay as the said one signal and combine the said one signal with the said further related signal(s) to form the output signal.

4. A signal processor according to claim 2, wherein the said one related signal is a direct signal having zero delay relative to the input signal.

5. A signal processor according to claim 2, wherein the said one related signal is an intermediate one of a series of at least three related signals.

6. A signal processor according to claim 1, wherein the plurality of related signals is greater than two in number, and wherein the variable combining means leave in the said combination valid related signals between which differences are small and exclude from the combination invalid related signals having differences relative to the valid signals which are not small.

7. A signal processor according to claim 6, wherein the variable combining means relace the or each related signal excluded from the combination forming the output signal by a further related signal having the same signal delay as one of the valid signals, such that the number of valid signals and further related signals which are combined is invariant.

8. A signal processor according to claim 6, wherein the variable combining means include separate variable combining means each operative upon a predetermined one of the related signals common to all the combining means and a corresponding one of the other related signals individual to the combining means, each separate variable combining means being operative to exclude its corresponding said other related signal from the output signal when the difference of this signal relative to the predetermined one signal is not small.

9. A signal processor according to claim 8, wherein each separate variable combining means replaces the excluded signal by a further related signal having the same signal delay as the predetermined one signal.

10. A signal processor according to claim 8, wherein the predetermined one signal is a direct signal having zero delay relative to the input signal.

11. A signal processor according to claim 8, wherein the predetermined one signal is an intermediate one of the related signals.

12. A signal processor according to claim 1, comprising a main signal circuit with an input for said input signal and an output for providing said output signal, and a further circuit, and wherein said variable combining means comprise a first combining means between said input and output, and a second, variable combining means in the further circuit and responsive to a delayed version of one related signal which is present at a selected one of the input and output sides of the first combining means and to an undelayed, second related signal at one of the input and output sides of the first combining means to feed to the first combining means a further circuit signal which subtracts from the signal in the main circuit and which consists substantially of the delayed version signal when the difference between the delayed version signal and the undelayed signal is small and which consists substantially of the undelayed signal when the said difference is not small.

13. A signal processor according to claim 12, wherein the variable second combining means is responsive to a delayed version of the signal at the output side of the first combining means and to an undelayed signal at the input side of the first combining means.

14. A signal processor according to claim 12, wherein the variable second combining means is responsive to an undelayed signal at the input side of the first combining means and to a delayed version of this signal.

15. A signal processor according to claim 12, wherein the variable second combining means is responsive to an undelayed signal at the output side of the first combining means and to a delayed version of this signal.

16. A signal processor according to claim 12, wherein the variable second combining means is responsive to a delayed version of the signal at the input side of the first combining means and to an undelayed signal at the output side of the first combining means.

17. A signal processor according to claim 12, wherein the variable second combining means comprises a diode circuit presenting a substantially reduced impedance to the undelayed, second related signal when this signal differs from the one related signal.

18. A noise reduction system comprising an encoding signal processor according to claim 1, for feeding an encoded signal to an information channel and a decoding signal processor for recovering a decoded signal from an encoded signal provided by the information channel, wherein the decoding signal processor comprises means for providing a decoded output signal from a plurality of related signals with similar wave shapes but with differing signal delays relative to the encoded input signal, means for deriving each of said related signals from a signal selected from one of said encoded input and decoded output signals, variable combining means for variably and additively combining the related signals to provide the decoded output signal and responsive to at least one difference between the related signals to cause the decoded output signal to consist of a combination of all the related signals when the difference is small and to exclude from the combination, when any said difference is not small, one or more of the related signals such that any difference pertaining to the non-excluded related signal or signals is small.

19. A noise reduction system according to claim 18, wherein the decoding signal processor comprises a main signal circuit with an input for said encoded input signal and an output for providing said decoded output signal, and a further circuit, and wherein the variable combining means comprises a first combining means between said input and output, and a second, variable combining means in the further circuit and responsive to a delayed version of one related signal which is present at a selected one of the input and output sides of the first combining means and to an undelayed, second related signal at one of the input and output sides of the first combining means to feed to the first combining means a further circuit signal which adds to the signal in the main circuit and which consists substantially of the delayed version signal when the difference between the delayed version signal and the undelayed signal is small and which consists substantially of the undelayed signal when the said difference is not small.

20. A signal processor according to claim 19, wherein the variable second combining means of the encoding signal processor is responsive to a delayed version of the signal at the output side of the first combining means and to an undelayed signal at the input side of the first combining means, and wherein the variable second combining means of the decoding signal processor is responsive to a delayed version of the signal at the input side of the first combining means and to an undelayed signal at the output side of the first combining means.

21. A signal processor according to claim 19, wherein the variable second combining means of the encoding signal processor is responsive to an undelayed signal at the input side of the first combining means and to a delayed version of this signal, and wherein the variable second combining means of the decoding signal processor is responsive to an undelayed signal at the output side of the first combining means and to a delayed version of this signal.

22. A signal processor according to claim 19, wherein the variable second combining means of the encoding signal processor is responsive to an undelayed signal at the output side of the first combining means and to a delayed version of this signal, and wherein the variable second combining means of the decoding signal processor is responsive to an undelayed signal at the input side of the first combining means and to a delayed version of this signal.

23. A signal processor according to claim 19, wherein the variable second combining means of the encoding signal processor is responsive to a delayed version of the signal at the input side of the first combining means and to an undelayed signal at the output side of the first combining means, and wherein the variable second combining means of the decoding signal processor is responsive to a delayed version of the signal at the output side of the first combining means and to an undelayed signal at the input side of the first combining means.

24. A signal processor according to claim 19, wherein the variable second combining means of the decoding signal processor comprises a diode circuit presenting a substantially reduced impedance to the undelayed, second related signal when this signal differs from the one related signal.

25. A signal processor according to claim 1, wherein the variable combining means effects an abrupt transition from causing the output signal to consist of a combination of all of the related signals to excluding one or more of the related signals, when any said difference exceeds a predetermined threshold.

26. A signal processor according to claim 1, wherein the variable combining means effects a gradual transition from causing the output signal to consist of a combination of all of the related signals to excluding one or more of the related signals, as any said difference increases above a predetermined lower threshold to a higher threshold.

27. A signal processor according to claim 25, wherein the variable combining means has frequency dependent characteristics such that the or each threshold is lower at some frequencies than at others.

28. A signal processor according to claim 26, wherein the variable combining means has frequency dependent characteristics such that the or each threshold is lower at some frequencies than at others.

29. A signal processor or noise reduction system according to claim 27, wherein the threshold is higher at lower frequencies than at high frequencies.

30. A signal processor or noise reduction system according to claim 28, wherein the threshold is higher at lower frequencies than at high frequencies.

31. A signal processor for processing an input signal and comprising means for providing an output signal from a plurality of related signals with similar wave shapes but with differing signal delays relative to the input signal, means for deriving each of said related signals from a signal selected from one of said input and output signals, at least one related signal being derived from the output signal, variable combining means for variably and additively combining the related signals to provide the output signal and responsive to at least one difference between the related signals to cause the output signal to consist of a combination of all the related signals when the difference is small and to exclude from the combination, when any said difference is not small, one or more of the related signals such that any difference pertaining to the non-excluded related signal or signals is small.

32. A signal processor according to claim 31, wherein the variable combining means are arranged to replace the or each exclused related signal by a further related signal which has the same signal delay as a predetermined one related signal and to combine the said one related signal with the said further related signal(s) to form the output signal.

33. A signal processor according to claim 32, wherein the said one related signal is a direct signal having zero delay relaive to the input signal.

34. A signal processor according to claim 32, wherein the said one related signal is an intermediate one of a series of at least three related signals.

35. A signal processor according to claim 32, wherein the plurality of related signals is greater than two in number, and wherein the variable combining means leave in the said combination valid related signals between which differences are small, exclude from the combination invalid related signals having differences relative to the valid signals which are not small, and replace the or each related signal excluded from the combination forming the output signal by a further related signal having the same signal delay as one of the valid signals, such that the number of valid signals and further related signals which are combined is invariant.

36. A signal processor according to claim 35, wherein the variable combining means include separate variable combining means each operative upon a predetermined one of the related signals common to all the combining means and a corresponding one of the other related signals individual to the combining means, each separate variable combining means being operative to exclude its corresponding said other related signals from the output signal when the difference of this signal relative to the predetermined one signal is not small, and to replace the excluded signal by a further related signal having the same signal delay as the predetermined one signal.

37. A signal processor according to claim 36, wherein the predetermined one signal is a direct signal having zero delay relative to the input signal.

38. A signal processor according to claim 36, wherein the predetermined one signal is an intermediate one of the related signals.

39. A signal processor according to claim 31, comprising a main signal circuit with an input for said input signal and an output for providing said output signal, and a further signal circuit, the variable combining means comprising a first combining means between said input and output, and a second, variable combining means in the further circuit and responsive to a delayed version of one related signal which is present at a selected one of the input and output sides of the first combining means and to an undelayed, second related signal at one of the input and output sides of the first combining means to feed to the first combining means a further circuit signal which combines with the signal in the main circuit and which consists substantially of the delayed version signal when the difference between the delayed version signal and the undelayed signal is small and which consists substantially of the undelayed signal when the said difference is not small, at least one of the said one and second related signals coming from the output side of the said first combining means.

40. A signal processor according to claim 39, wherein the variable second combining means is responsive to a delayed version of the signal on the input side of the first combining means and to an undelayed signal at the output side of the first combining means.

41. A signal processor according to claim 39, wherein the variable second combining means is responsive to an undelayed signal at the output side of the first combining means and to a delayed version of this signal.

42. A signal processor according to claim 39, wherein the variable combining means is responsive to a delayed version of the signal at the output side of the first combining means and to an undelayed signal at the input side of the first combining means.

43. A signal processor according to claim 40, wherein the variable second combining means comprises a diode circuit presenting a substantially reduced impedance to the undelayed second, related signal when this signal differs from the one related signal.

44. A signal processor according to claim 31, wherein the variable combining means effects an abrupt transition from causing the output signal to consist of a combination of all of the related signals to excluding one or more of the related signals, when any said difference exceeds a predetermined threshold.

45. A signal processor according to claim 31, wherein the variable combining means effects a gradual transition from causing the output signal to consist of a combination of all of the related signals to excluding one or more of the related signals, as any said difference increases above a predetermined lower threshold to a higher threshold.

46. A signal processor according to claim 44, wherein the variable combining means has frequency dependent characteristics such that the threshold is lower at some frequencies than at others.

47. A signal processor according to claim 45, wherein the variable combining means has frequency dependent characteristics such that the threshold is lower at some frequencies than at others.

48. A signal processor according to claim 46, wherein the threshold is higher at low frequencies that at high frequencies.

49. A signal processor according to claim 47, wherein the threshold is higher at low frequencies than at high frequencies.

50. A signal processor for processing an input signal and comprising means for providing an output signal from a plurality of related signals with similar wave shapes and including at least first and second related signals with differing signal delays relative to the input signal and a further related signal with the same signal delay relative to the input signal as the first related signal, means for deriving each of said related signals from a signal selected from one of said input and output signals, at least one related signal being derived from the output signal, variable combining means for variably and additively combining the first and second related signals to provide the output signal and responsive to a difference between the first and second related signal to exclude from the combination, when the said difference is not small, the second related signal and to replace the excluded second related signal by the further related signal.

51. A video signal processor for processing an input signal to provide an output signal having a reduced noise content, said processor comprising
    means for delaying said output signal by a preselected time period to produce a delayed signal;
    means for additively combining a selected amplitude portion of such delayed signal with a selected amplitude portion of said input signal to produce said output signal; and
    means operative to detect an amplitude difference between the input signal and the delayed signal and responsive to said difference for dynamically controlling the selected amplitude portions of said input signal and said delayed signal.

52. A processor in accordance with claim 51 wherein said controlling means includes means for reducing the selected amplitude portion of said delayed signal substantially to zero when the difference between the amplitude of said input signal and said delayed signal exceeds a predetermined threshold.

53. A processor in accordance with claim 51 wherein said delaying means delays said output signal by a time period substantially equal to one video frame period.

54. A processor in accordance with claim 52 wherein said controlling means includes
    means for comparing the amplitude of said input signal and said delayed signal to provide a signal representing the difference therebetween, said reducing means being responsive to said difference signal for reducing the selected amplitude portion of said delayed signal substantially to zero when said difference exceeds said predetermined threshold.

55. A signal processor for removing noise from a video signal, comprising
    an input terminal;
    an output terminal;
    a field or picture period delay means having an input connected to said output terminal;
    a variable combining circuit having inputs connected to said input terminal and to the output of said delay means and arranged to combine additively variable amplitude proportions of the output signal from said delay means with the signal on said input terminal to provide an output signal at said output terminal; and
    means operative to detect a difference between the amplitudes of the signals connected to the inputs of said variable combining circuit and responsive to said difference to reduce said variable amplitude proportion of the signal at the output of said delay means contributed to said output signal when said difference exceeds a predetermined threshold.

56. A noise reduction system comprising an encoding signal processor for feeding an encoded signal to an information channel and a decoding signal processor for recovering a decoded output signal from an encoded signal provided by the information channel,
    said encoding signal processor including
        first means for delaying said input signal by a preselected time period to produce a first delayed signal;
        first means for subtractively combining a selected amplitude portion of said first delayed signal with a selected amplitude portion of said encoded signal to produce said encoded signal for supply to said information channel;
    said decoding signal processor including
        second means for delaying said decoded-output signal by said preselected time period to produce a second delayed signal; and
        second means for additively combining a selected amplitude portion of said second delayed signal with a selected amplitude portion of the encoded signal from said information channel to produce said decoded output signal.

57. A noise reduction system in accordance with claim 56 wherein
    said first combining means includes first means for controlling the selected amplitude portions of said first delayed signal and said encoded signal; and
    said second combining means includes second means for controlling the selected amplitude portions of said second delayed signal and said encoded signal.

58. A system in accordance with claim 57 wherein said first controlling means includes means for reducing the selected amplitude portion of said first delayed signal substantially to zero when the difference between said encoded signal and said first delayed signal exceeds a predetermined threshold; and said second controlling means includes means for reducing the selected amplitude portion of said second delayed signal substantially to zero when the difference between the amplitude of the encoded signal from said information channel and said second delayed signal exceeds a predetermined threshold.

59. A noise reduction system in accordance with claim 56 or 57 wherein
said first and said second delaying means delay said input signal and said decoded output signal, respectively, by a time period substantially equal to one video frame period.

60. A system in accordance with claim 58 wherein said first controlling means comprises
first means for comparing the amplitude of said input encoded signal with the amplitude of said first delayed signal to determine the difference therebetween; and
first means for reducing the selected amplitude portion of said first delayed signal substantially to zero when said difference exceeds said predetermined threshold; and said second controlling means comprises
second means for comparing the amplitude of the encoded signal from said information channel with the amplitude of said second delayed signal to determine the difference therebetween; and
second means for reducing the selected amplitude portion of said second delayed signal substantially to zero when said difference exceeds said predetermined threshold.

* * * * *